United States Patent
Prabagaren

(10) Patent No.: US 11,887,143 B2
(45) Date of Patent: Jan. 30, 2024

(54) RECORD MANAGEMENT SYSTEM FOR ENABLING ACCESS TO A RECORD

(71) Applicant: Capital One Services, LLC, McLean, VA (US)

(72) Inventor: Gokul Prabagaren, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 94 days.

(21) Appl. No.: 17/302,042

(22) Filed: Apr. 22, 2021

(65) Prior Publication Data

US 2022/0343359 A1    Oct. 27, 2022

(51) Int. Cl.
  *G06F 7/00* (2006.01)
  *G06F 17/00* (2019.01)
  *G06Q 30/0226* (2023.01)
  *G06F 16/23* (2019.01)

(52) U.S. Cl.
  CPC ..... *G06Q 30/0226* (2013.01); *G06F 16/2358* (2019.01); *G06F 16/2365* (2019.01)

(58) Field of Classification Search
  None
  See application file for complete search history.

(56) References Cited

U.S. PATENT DOCUMENTS

| | | | |
|---|---|---|---|
| 6,889,198 B2 | 5/2005 | Kawan | |
| 7,949,559 B2 | 5/2011 | Freiberg | |
| 9,537,880 B1 * | 1/2017 | Jones | H04L 63/1433 |
| 10,007,923 B1 * | 6/2018 | Strock | G06Q 30/0213 |
| 10,354,269 B2 | 7/2019 | Wesley | |
| 10,909,529 B2 | 2/2021 | Ortiz et al. | |
| 2008/0210753 A1 | 9/2008 | Plozay et al. | |
| 2010/0332403 A1 | 12/2010 | Angell et al. | |
| 2017/0078322 A1 * | 3/2017 | Seiver | H04L 63/1433 |
| 2019/0073666 A1 * | 3/2019 | Ortiz | H04L 9/0637 |
| 2019/0318100 A1 * | 10/2019 | Bhatia | G06F 21/57 |

* cited by examiner

Primary Examiner — Tuan A Pham
(74) Attorney, Agent, or Firm — Harrity & Harrity, LLP

(57) ABSTRACT

In some implementations, a system may receive an indication that a record has been generated based on an event involving a user account. The system may provide the record to an online portal to cause the online portal to upload the record. The system may receive, from the online portal, a notification that indicates that the record has been uploaded via the online portal. The system may store, based on receiving the notification, the record in a record log that is associated with the user account.

20 Claims, 6 Drawing Sheets

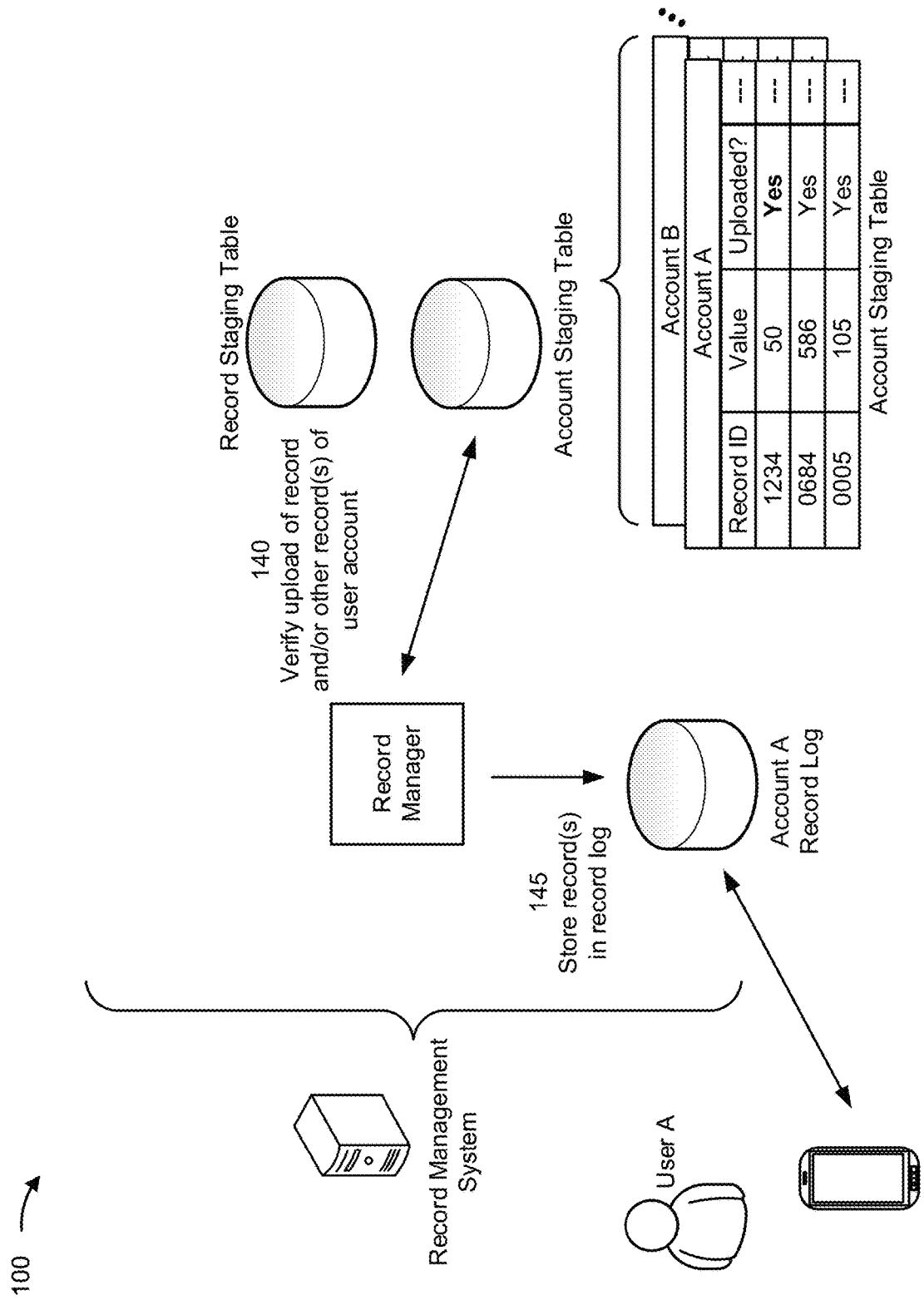

RECORD MANAGEMENT SYSTEM FOR ENABLING ACCESS TO A RECORD

BACKGROUND

Activity associated with a user account may be tracked using records in a record log. For example, the activity may involve events involving a user of the user account and/or actions performed by the user in association with the user account. Certain types of events and/or actions may define attributes included in the records.

SUMMARY

In some implementations, a system for verifying that a record is to be stored in a record log includes one or more memories, and one or more processors, communicatively coupled to the one or more memories, configured to: receive an indication that the record has been generated based on an event involving a user account; provide the record to an online portal to cause the online portal to upload information that is associated with the record, wherein the online portal is accessible to one or more client systems that are configured to provide a service in association with the user account; verify, based on receiving a notification from the online portal, that the information was uploaded via the online portal; and store, based on verifying that the information was uploaded via the online portal, the record in the record log that is associated with the user account to permit a user of the user account to access the information.

In some implementations, a method includes receiving an indication that a record has been generated based on an event involving a user account; providing the record to an online portal to cause the online portal to upload the record; receiving, from the online portal, a notification that indicates that the record has been uploaded via the online portal; and storing, based on receiving the notification, the record in a record log that is associated with the user account.

In some implementations, a non-transitory computer-readable medium storing a set of instructions includes one or more instructions that, when executed by one or more processors of a device, cause the device to: receive a notification that indicates that a record that is associated with a user account has been uploaded via an online portal, wherein the online portal is accessible to one or more client systems that are configured to provide a service in association with the user account; identify, in a staging table associated with uploading records via the online portal, another record associated with the user account; verify that the other record has been uploaded via the online portal; and store, based on receiving the notification and verifying that the other record has been uploaded, the record in a record log that is associated with the user account.

BRIEF DESCRIPTION OF THE DRAWINGS

FIGS. 1A-1C are diagrams of an example implementation relating to a record management system for enabling access to a record.

DETAILED DESCRIPTION

Figure 1A:
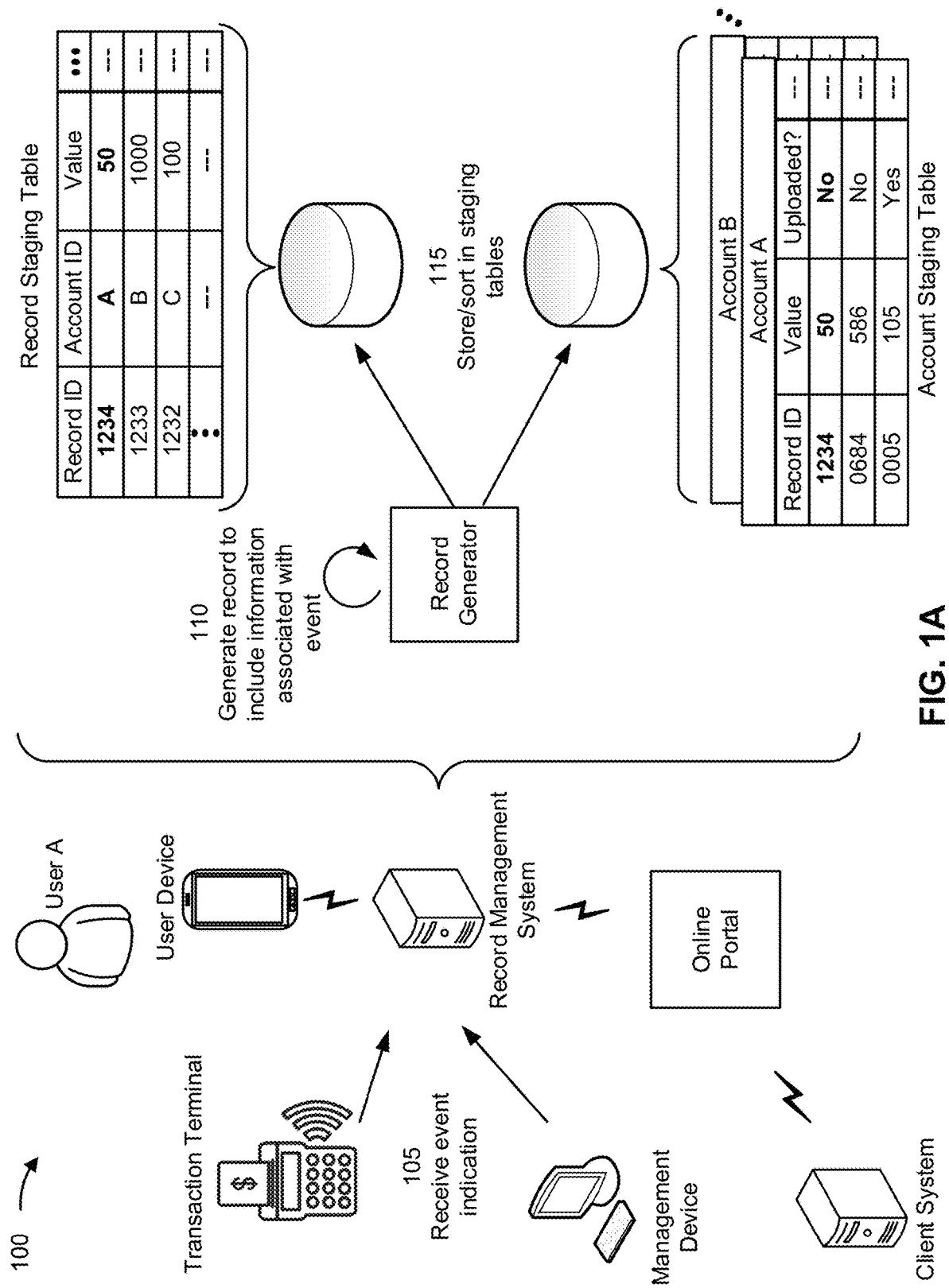

The following detailed description of example implementations refers to the accompanying drawings. The same reference numbers in different drawings may identify the same or similar elements.

Various applications may utilize records and/or a record log (e.g., a collection of records) to manage and/or provide information associated with sources of the records. For example, a record log may maintain records associated with events and/or actions involving an account associated with the record log. Further, a user may register an account (e.g., a user account and/or membership account) with an application that is configured to maintain the record log for the user. A record management system of the application may manage the account by logging records associated with events or actions involving the user. For example, the user may access the record log to review information associated with the events and/or actions associated with the records. As a more specific example, a banking application may utilize a record log to maintain records of transactions (e.g., credits and/or debits of the account) involving an account registered to a user (e.g., a transaction account holder, such as a consumer or customer) of a banking institution or other type of financial institution. In such an example, the user, via the banking application, may review record logs corresponding to financial statements, transaction activity, and/or rewards earned from the transaction activity (e.g., rewards associated with a benefit program of the banking institution. For example, the user may monitor rewards earnings based on transactions performed using the account, may review rewards balances associated with the account, and/or receive/identify rewards redemption opportunities that are offered by the banking institution.

In some instances, a record management system (e.g., associated with a backend system of the application) may receive information associated with an event (e.g., an indication that a record has been generated or is to be generated), process the information to generate a record associated with the event and/or identify an account associated with the information, and store the record in a record log that is associated with the account (e.g., to permit a user of the account to access the record). Further, the record management system may forward the record to another system to permit the other system to identify that the user engaged in an event associated with the record.

As a more specific example, the record management system may store a rewards record in the record log to permit the user to identify rewards associated with a transaction that are earned via a benefit program. Furthermore, the record management system may also provide the rewards record to one or more business units of a banking institution associated with the benefits program (e.g., to permit a financial unit to account for the rewards earning and/or to permit a marketing unit to identify a type of transaction that earned the rewards, among other examples). In such cases, the record management system may store the records in the record log before the records are received by the one or more business units (e.g., permitting the user to access the records before the one or more business units). Further, the rewards records may be made available to the user via the record log sooner than the rewards records are available or accessible to the one or more business units. For example, because the record log is only receiving records associated with the account of the user, the record can be stored more quickly in the record log than by separate systems associated with the one or more business units that are also receiving and storing records associated with multiple other accounts (e.g., thousands of accounts, tens of thousands of accounts, or more). Moreover, the record management system may sequentially forward the records to the individual systems of the one or more business units, further extending the duration of time between the user having access to the rewards record and a last system of a last business unit that receives the rewards record. Accordingly, the user may redeem or perform one or more operations associated with the rewards prior to the rewards records being available to the one or more business units (e.g., preventing the one or more business units from performing certain actions associated with the rewards records prior to the user redeeming the rewards).

In some instances the record management system may encounter certain processing errors and/or failures that cause inaccuracies in the records (e.g., due to inaccuracies in the information, due to inaccurate inputs used to generate the records, and/or the like). For example, an inaccurate rewards record may be generated based on inaccurate information associated with a transaction (e.g., information that identifies an incorrect value and/or an incorrect merchant identifier) and/or inaccurate earning information associated with a benefit program (e.g., an inaccurate earnings multiplier or reward amount associated with the transaction or merchant identifier). Accordingly, the user and/or one or more business units may have access to inaccurate rewards records.

Some implementations described herein provide a record management system that processes a record associated with a user account of a user and ensures that the records are uploaded via an online portal (e.g., an online portal that is accessible to one or more client systems) prior to storing the record to a record log that is accessible to the user. For example, the record management system may receive and/or process a record, provide the record to the online portal, and verify that the record was uploaded to the online portal prior to storing the record in the record log to ensure that a client system has access to the record prior to a user device associated with the user (e.g., a user device with an application that permits access to the record log via the user account) having access to the record. In this way, the record management system may prevent the user from performing one or more actions associated with the record (e.g., redeem rewards associated with the record) before the client system is capable of performing another action associated with the record (e.g., indicate a particular redemption opportunity associated with the rewards). In some implementations, the record management system may confirm that multiple records (e.g., records that are generated and/or associated with a particular time period) are uploaded via the online portal before any of the records are stored in the record log. For example, the record management system may utilize one or more staging tables to process multiple records associated with a particular time period to verify that information (e.g., total rewards earnings) associated with the multiple records is accurately provided and/or uploaded via the online portal prior to the user having access to one or more of the multiple records. In this way, the record management system may prevent errors in processing rewards and/or prevent the user (e.g., via a user device) from performing an action with one or more of the records until the client system has access to all of the records associated with the particular time period (e.g., to permit the client system to account for total rewards earned during the particular time period before the user redeems any of the rewards).

Figure 1B:
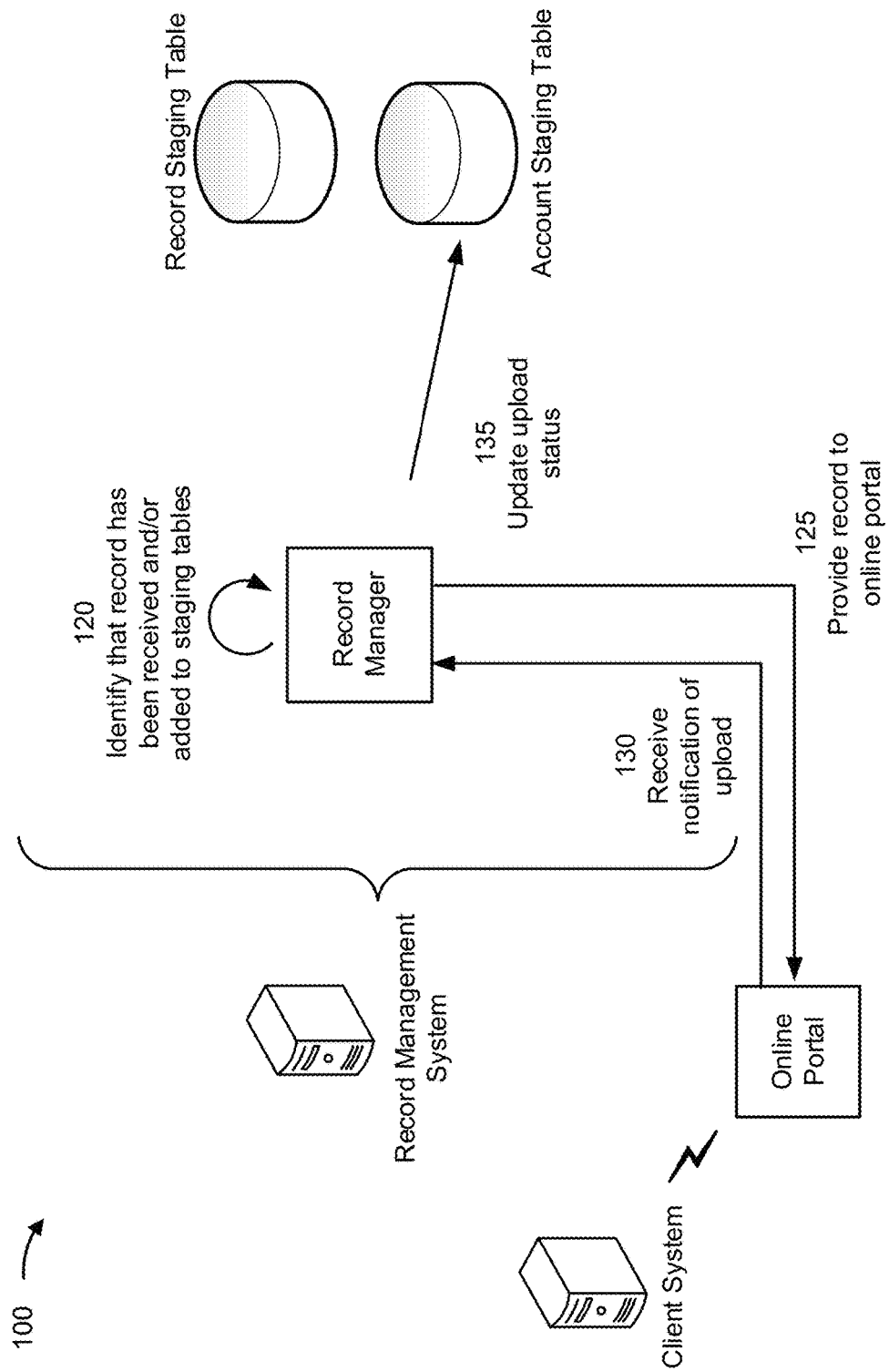

FIGS. 1A-1C are diagrams of an example implementation 100 associated with a record management system for enabling access to a record. As shown in FIGS. 1A-1C, example implementation 100 includes a record management system, a user device, a transaction terminal, a management device, an online portal, and a client system. In example implementation 100, the record management system includes a record generator, a record staging table, an account staging table, a record manager, and a record log. These devices are described in more detail below in connection with FIG. 2 and FIG. 3. In example implementation 100, a user (shown as User A) is associated with a user device and may have a user account that is registered to an application that is executing on the user device and/or that is associated with (or managed by) the record management system (e.g., via an application server associated with the application).

As described herein, records of a record log may be associated with various transactions. While certain examples are described herein with reference to one or more rewards-based transactions (e.g., one or more financial transactions involving a purchase and/or a refund that affects earning rewards of a benefit program), the examples may similarly apply to other types of transactions, such as a security-related transaction (e.g., associated with individuals gaining access to secure areas and/or devices gaining access to secure computing systems), a data-related transaction (e.g., associated with providing or receiving data), and/or a resource-related transaction (e.g., associated with allocating or distributing computing resources, such as processing resources and/or memory resources).

As shown in FIG. 1A, and by reference number 105, the record management system receives an event indication. For example, the record management system may receive a message and/or notification that an event associated with the user account of User A occurred. The event may correspond to User A being engaged in a transaction via the transaction terminal. In some implementations, the indication is received from the transaction terminal or another device associated with processing a transaction via the transaction terminal, such as a transaction backend system. In some implementations, the transaction may correspond to a transaction that is associated with a benefit program. Accordingly, the transaction may trigger the record management system to generate a rewards record as described elsewhere herein.

In some implementations, the event indication may indicate that a reward has been issued to the user account via the management device. For example, the reward may be issued, via the management device, by a service representative (e.g., a customer service representative) of a banking institution (or other type of institution) that is associated with the user account and/or the benefit program.

The event indication may identify event information associated with the event and/or parties involved in the event. For example, for a transaction, the event information may include an identifier of User A and/or the user account (e.g., an account number), a type of the transaction, a merchant identifier of a merchant involved in the transaction (e.g., a merchant that is engaged in the transaction), a merchant type that indicates a type of the merchant (e.g., identifying a type of the merchant), and/or a location of the transaction, among other examples. Additionally, or alternatively, the event indication may indicate information associated with a reward this is being issued based on the event and/or information associated with the benefit program.

In some implementations, the event notification may correspond to or include a record that has been generated based on the event. For example, in such a case, the record may be generated by the transaction terminal and/or the management device. In this way, the record management system may receive an indication that the record has been generated based on an event involving the user account.

As further shown in FIG. 1A, and by reference number 110, a record generator of the record management system generates a record to include the information associated with the event. For example, the record generator may generate the record based on the information identified in the event indication. More specifically, the record may be generated to include the event information and/or rewards information that is determined based on a transaction. Accordingly, in such a case, the record may correspond to a rewards record associated with the user account. In such a case, the record generator may generate the record based on calculating a rewards value associated with the transaction according to the benefit program (e.g., based on the value of the transaction, based on the merchant type, and/or based on a multiplier associated with the merchant type). In example implementation 100, the record generator, based on the event notification, generates a record that is identified by 1234 (referred to herein as "record 1234").

While example implementation 100 indicates that the record manager generates the record via the record generator, the record may be generated and/or provided by another system. For example, the record may be generated based on a system (e.g., the transaction terminal and/or a transaction backend system) associated with the record management system processing information (e.g., event information) associated with the event. Additionally, or alternatively, the record may be generated based on the management device generating and/or providing the record (e.g., which includes the event information).

As further shown in FIG. 1A, and by reference number 115, the record generator stores and/or sorts the record in one or more staging tables. For example, the record generator may store the record in a staging table (and/or an identifier of the record) for processing uploads of records associated with one or more user accounts. The one or more staging tables may be used to ensure that generated records are accurately created and/or provided to a user and/or a client system. For example, a first staging table may be configured to maintain transaction information and/or corresponding rewards information that is to be made available to a user and/or a client system, and another staging table may be used to process an upload of the transaction information and/or the rewards information to the online portal.

In example implementation 100, the record generator may generate and/or duplicate a record to permit the record generator to store a first copy of the record in a record staging table and a second copy of the record in an account staging table. The record staging table may correspond to a data structure that temporarily stores records for processing. The record staging table may store the records based on an order in which the records are generated (and/or an order in which the records are received from the transaction terminal and/or the management device). In such a case, the record generator quickly and efficiently stores records as received and/or as generated, thereby preventing any processing issues and/or failures associated with the records). Accordingly, as shown, record 1234 is stored as an entry in the record staging table, and identifies event information, including an identifier of the account (shown as "A") and a value of a transaction (shown as "50"). In this way, the record staging table may correspond to a backup table that can be accessed in the event an error or failure occurs in association with storing a record in the account staging table and/or to a record log of a record log associated with a user account, as described elsewhere herein.

The account staging table may correspond to an organized data structure that is sorted, mapped, and/or grouped based on identifiers of user accounts that are associated with the records. As shown, the account staging table may include an upload status associated with the records. For example, the upload status may correspond to a flag and/or annotation that indicates whether or not a corresponding record has been provided to the online portal and/or uploaded via the online portal. Accordingly, the upload statuses of a user account may indicate whether information associated with one or more records and/or events has been uploaded via the online portal. More specifically, as shown, record 1234 and another record of Account A that is identified by 0684 (referred to herein as "record 0684") have not been uploaded (indicated by an upload status of "No"), and a record identified by 0005 (referred to herein as "record 0005") has been uploaded (indicated by an upload status of "Yes"). In some implementations, as described elsewhere herein, the record 0005 may be included within the account staging table, despite the record being published by the online portal, because another record associated with Account A has yet to be published via the online portal (e.g., record 0684 and/or record 1234).

The account staging table may permit the record management system to quickly and efficiently identify and/or verify whether one or more records associated with a particular user account have been uploaded. For example, as described elsewhere herein, the record management system may utilize the account staging table and/or the record staging table to verify that each record in the account staging table of Account A has been uploaded before storing the records in a record log that is accessible to User A (and/or that is associated with Account A).

In some implementations, the record staging table and/or the account staging table is configured to store and/or maintain records that are associated with a designated time period. For example, the time period may be designated and/or defined according to a time period associated with occurrences of events and/or time periods associated with records being stored. For example, the record staging table and/or the account staging table may be configured to store records for events that occurred during a particular portion of a day (e.g., a particular half of the day), during a particular day, and/or within a particular week. Accordingly, prior to storing records associated with the time period as described elsewhere herein, the record management system may use the record staging table and/or the account staging table to verify that all records associated with a designated time period have been uploaded via the online portal. In this way, the record management system may verify that the client system has access to records associated with the designated time period before User A has access to any of the records associated with the same designated time period.

As shown in FIG. 1B, and by reference number 120, a record manager of the record management system identifies that a record has been received and/or has been added to the one or more staging tables. For example, the record manager may be configured to manage processing and/or access of the records generated by the record generator, the transaction terminal, and/or the management device. The record manager may identify a new record (e.g., record 1234 in the example above) based on monitoring the record staging table and/or the account staging table for added records.

The record manager may use the record staging table and/or the account staging table to process a record as described herein. For example, the record manager may utilize the record staging table to store any and/or all information associated with an event associated with a record, and may utilize the account staging table to monitor the upload statuses of records associated with a user account. For example, the record manager may monitor and/or update the upload statuses of the records for Account A based on identifying the records being added to the staging tables of example implementation 100 and/or based on receiving acknowledgements and/or indications from the online portal that the records have been uploaded, as described elsewhere herein.

As further shown in FIG. 1B, and by reference number 125, the record manager provides the record to the online portal. For example, the record manager may provide the record to the online portal to cause and/or permit the online portal to upload the record. The online portal may be configured to upload the record (and/or information associated with the record) to an interface (e.g., a website, a feed, and/or a publication page) of the online portal that is accessible to the client system. As described above, the record manager may provide the record to the online portal based on the upload status of the record in the account staging table indicating that the record has not been uploaded via the online portal.

The online portal may be a privately managed online portal (e.g., a portal of an intranet and/or a private cloud computing environment). For example, the online portal may be accessible to one or more client systems that are configured to provide a service in association with the user account of User A. The service may be associated with processing rewards (e.g., rewards earning and/or rewards redemption) in association with a benefit program, as described above, processing transactions involving Account A or other accounts that are managed by the record manager, and/or marketing or advertising offers to User A via the application and/or the user device. Accordingly, referring to the example of a banking institution, the one or more client systems may be associated with one or more of a finance business unit of the banking institution (or a particular type of finance business unit), a rewards processing business unit of the banking institution, a marking business unit of the banking institution, and/or a product development business unit of the banking institution, among other examples. Therefore, the client system may have access to the online portal based on being authorized to access the online portal as a system that is associated with an entity (e.g., a banking institution or other type of organization) that manages the user account. More specifically, the client system may be permitted to access the online portal based on being associated with a business unit of the entity, a subsidiary of the entity, and/or a partner of the entity. Additionally, or alternatively, the record management system may implement (or cause the online portal to implement) an authentication process (e.g., using a credential and/or an encryption technique) to permit the client system to access the online portal. In this way, the client system may be authorized to access the records (and/or information in the records) based on an authentication process that verifies that the client system is associated with the entity.

As further shown in FIG. 1B, and by reference number 130, the record manager receives a notification of an upload of the record from the online portal. For example, the notification may correspond to an acknowledgement of receipt of the record and/or a verification that the record was uploaded via the online portal. Accordingly, the notification may indicate that the record (and/or information associated with the record) is available to the client system (e.g., which is prior to the record being stored to the record log or available to User A).

As described elsewhere herein, the record management system may prevent a record (e.g., record 1234) from being stored in the record log until the record management system receives a notification that another record associated with the user account has been verified as uploaded via the online portal. In some implementations, the record management system may prevent the record from being stored in the record log until notifications are received for all records that are associated with the user account and indicated in the account staging table, thereby indicating that all notifications have been published via the online portal.

As further shown in FIG. 1B, and by reference number 135, the record manager updates the upload status of the record in the account staging table. For example, based on verifying that information associated with records 1234 was uploaded, the record manager may update the upload status of record 1234 to indicate that the record has been published via the online portal (e.g., change the upload status from "No" to "Yes"). Accordingly, the record management system may prevent one or more other records associated with Account A (e.g., record 0684 and/or record 0005) from being uploaded until the upload status of record 1234 has been updated in the account staging table. Furthermore, in some implementations, the record management system may prevent one or more of the records associated from being uploaded until all records in the account staging table that are associated with Account A have upload statuses that indicate that all of the records associated with Account A have been uploaded via the online portal.

In some implementations, records associated with a user account (e.g., Account A) are stored in the account staging table and/or the record staging table until any additional records that are associated with the user have been verified as uploaded via the online portal. Additionally, or alternatively, once all records associated with a user account (e.g., user Account A) are verified as uploaded, the records may be removed from the account staging table and/or the record staging table. In some implementations, the records may be removed after the records have been stored to the record log, as described elsewhere herein. Additionally, or alternatively, one or more records (e.g., record 0684 and/or record 0005) may be prevented from being stored in the record log until any additional records (e.g., record 1234) that are associated with the user account and that are stored in the staging table have been verified as uploaded via the online portal.

As shown in FIG. 1C, and by reference number 140, the record manager verifies the upload of the record and/or upload(s) of other record(s) of the user account. For example, the record manager may verify that record 1234 has been uploaded based on the notification from the online portal and/or based on the account staging table indicating that the upload status of record 1234 has been uploaded via the online portal. In some implementations, the record manager may verify that all records associated with a particular user account have been uploaded. For example, based on receiving a notification that record 1234 has been uploaded and/or verified as uploaded, the record manager may verify that other records (e.g., record 0684 and record 0005) associated with Account A have been verified (e.g., to confirm that the records can be stored to the record log as described elsewhere herein).

In some implementations, the records in the staging table associated with Account A may be monitored in association with the record manager storing one or more records that are associated with a particular time period. For example, the record manager may determine that events associated with record 1234, record 0684, and record 0005 are associated with one another based on being associated with Account A and based on record 1234, record 0684, and 0005 occurring during a same time period (e.g., on a same day). Accordingly, the record manager may verify that all records in the account staging table that occurred during a same designated time period have been uploaded prior to storing the records to the record log, as described elsewhere herein.

In this way, prior to storing record 1234 in the record log (e.g., which enables User A to access record 1234), the record manager may verify that record 1234 and/or information associated with record 1234 was uploaded via the online portal (e.g., to an interface of the online portal that is accessible to the client system).

As further shown in FIG. 1C, and by reference number 145, the record manager stores the record(s) in the record log. The record manager may store record 1234 to the record log based on verifying that record 1234 was uploaded via the online portal and/or based on receiving a notification that the record 1234 (or information associated with record 1234) was uploaded via the online portal. Additionally, or alternatively, the record manager may store multiple records associated with Account A after verifying that all of the records have been verified as uploaded via the online portal. In such a case, the record manager may verify that any or all records associated with Account A that are in the account staging table or the record staging table have been verified as uploaded via the online portal. Additionally, or alternatively, the record manager may verify that any or all records that are associated with Account A and that occurred or are associated with a designated time period have been uploaded via the online portal. Accordingly, once the record(s) are stored in the record log User A may access the records after the records have been made available to the client system (and/or other client systems that have access to the online portal).

In example implementation 100, the record and the other record are stored in the record log based on identifying that both the record and the other record have been uploaded to the online portal and determining that only the record and the other record are records in the staging table that are associated with the user account.

In some implementations, after a record is stored in a record log, the record management system may remove the record from a staging table used to process uploads of records. Accordingly, after record 1234, record 0684, and record 0005 are stored to the record log, the record management system (e.g., via the record manager) may remove record 1234, record 0684, and record 0005 from the record staging table and/or the account staging table.

Accordingly, as described herein, the record management system provides a system that ensures that a client system has access to a record (and/or information associated with the record) via an online portal prior to a user associated with the records having access to the records. The online portal permits multiple client systems to access the records ahead of the user having access to the record. Furthermore, the record management system may utilize one or more staging tables to verify that the records are accurate and/or are accurately uploaded prior to storing the records to a record log of the user. In this way, the record management system may prevent records from being provided to the user ahead of the client systems, thereby preventing the user from performing one or more actions involving the records prior to the client system performing one or more other actions associated with the records.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
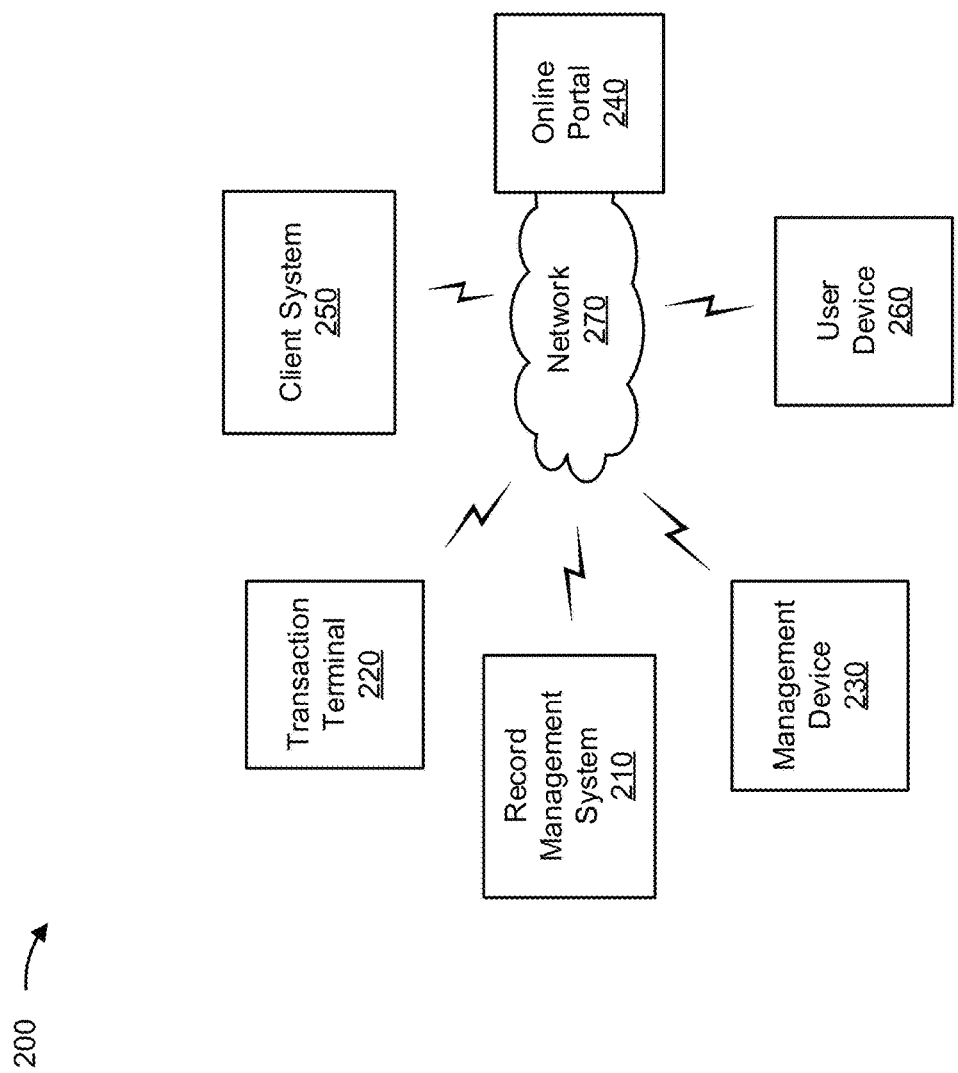
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a record management system 210, a transaction terminal 220, a management device 230, an online portal 240, a client system 250, a user device 260, and a network 270. Devices of environment 200 may interconnect via wired connections, wireless connections, or a combination of wired and wireless connections.

The record management system 210 includes one or more devices capable of receiving, generating, storing, processing, providing, and/or routing information associated with processing, uploading, storing and/or enabling access to a record, as described elsewhere herein. The record management system 210 may include a communication device and/or a computing device. For example, the record management system 210 may include a server, such as an application server, a client server, a web server, a database server, a host server, a proxy server, a virtual server (e.g., executing on computing hardware), or a server in a cloud computing system. In some implementations, the record management system 210 includes computing hardware used in a cloud computing environment.

The transaction terminal 220 includes one or more devices capable of facilitating an electronic transaction. For example, the transaction terminal 220 may include a point-of-sale (PoS) terminal, a payment terminal (e.g., a credit card terminal, a contactless payment terminal, a mobile credit card reader, or a chip reader), and/or an automated teller machine (ATM). The transaction terminal 220 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the transaction terminal 220 include a number keypad, a touchscreen, a magnetic stripe reader, a chip reader, and/or a radio frequency (RF) signal reader (e.g., a near-field communication (NFC) reader). Example output devices of transaction terminal 220 include a display and/or a speaker.

The management device 230 includes one or more devices capable of receiving, generating, storing, processing, and/or providing information associated with generating a record and/or providing information associated with a record, as described elsewhere herein. The management device 230 may include a communication device and/or a computing device. For example, the management device 230 may include a wireless communication device, a mobile phone, a user equipment, a laptop computer, a tablet computer, a desktop computer, or a similar type of device associated with an entity that is configured to provide a service in association with an application of the user device 260, as described elsewhere herein.

The online portal 240 includes one or more devices capable of receiving, generating, storing, processing, providing, and/or routing information associated with uploading a record and/or information associated with a record to permit the record and/or the information to be accessible to the client system 250, as described elsewhere herein. The online portal 240 may include a communication device and/or a computing device. For example, the online portal 240 may include a server, such as an application server, a client server, a web server, a database server, a host server, a proxy server, a virtual server (e.g., executing on computing hardware), or a server in a cloud computing system. In some implementations, the online portal 240 includes computing hardware used in a cloud computing environment.

The client system 250 includes one or more devices capable of receiving, generating, storing, processing, providing, and/or routing information associated with accessing a record in association with providing a service for a user account based on the record, as described elsewhere herein. The client system 250 may include a communication device and/or a computing device. For example, the client system 250 may include a server, such as an application server, a client server, a web server, a database server, a host server, a proxy server, a virtual server (e.g., executing on computing hardware), or a server in a cloud computing system. In some implementations, the client system 250 includes computing hardware used in a cloud computing environment.

The user device 260 includes one or more devices capable of receiving, generating, storing, processing, and/or providing information associated with accessing a record of a record log of a user account and/or information associated with an application associated with the user account, as described elsewhere herein. The user device 260 may include a communication device and/or a computing device. For example, the user device 260 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 270 includes one or more wired and/or wireless networks. For example, the network 270 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 270 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
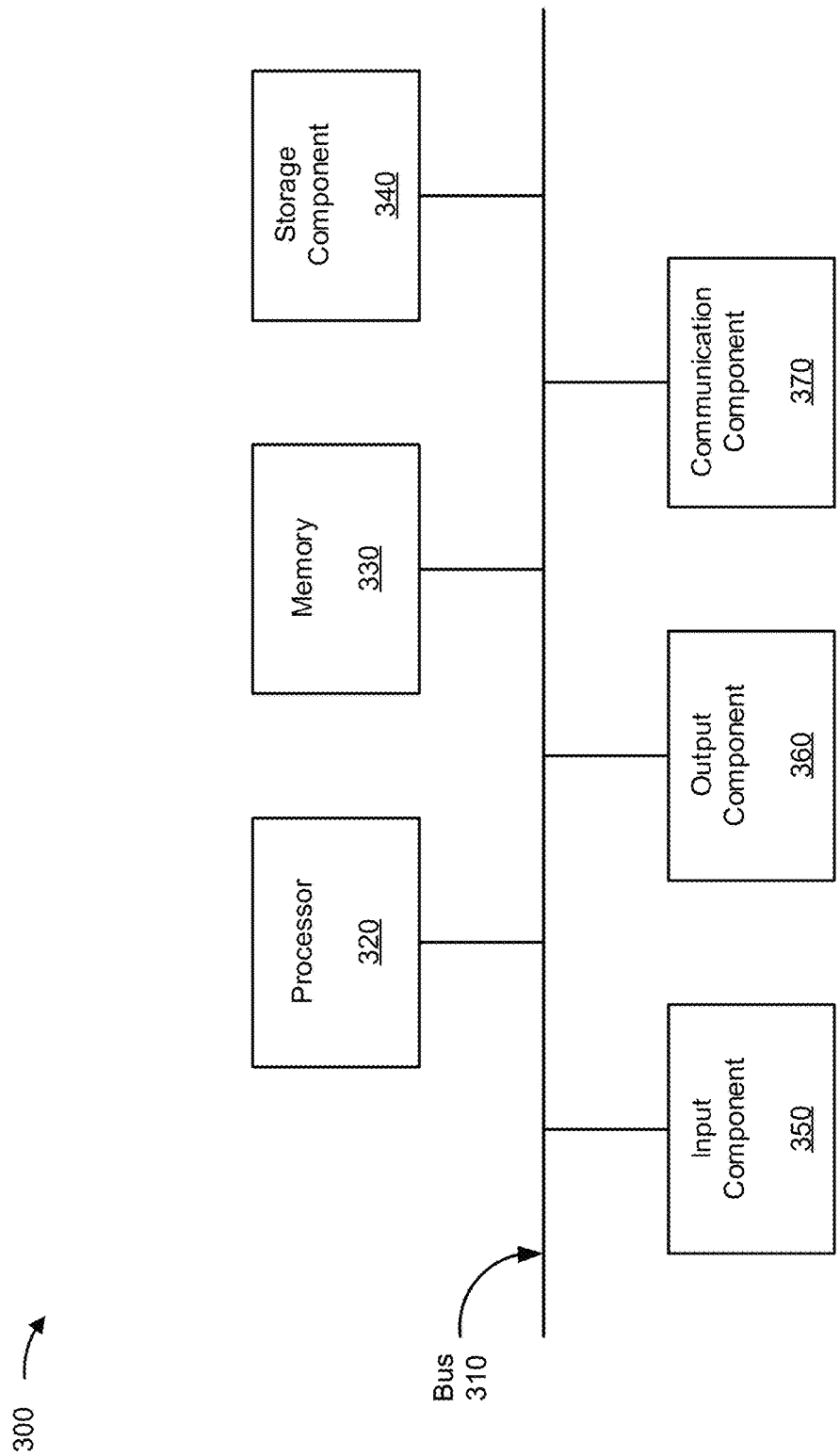
FIG. 3 is a diagram of example components of one or more devices of FIG. 2.

FIG. 3 is a diagram of example components of a device 300, which may correspond to the record management system 210, the transaction terminal 220, the management device 230, the online portal 240, the client system 250, and/or the user device 260. In some implementations, the record management system 210, the transaction terminal 220, the management device 230, the online portal 240, the client system 250, and/or the user device 260 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
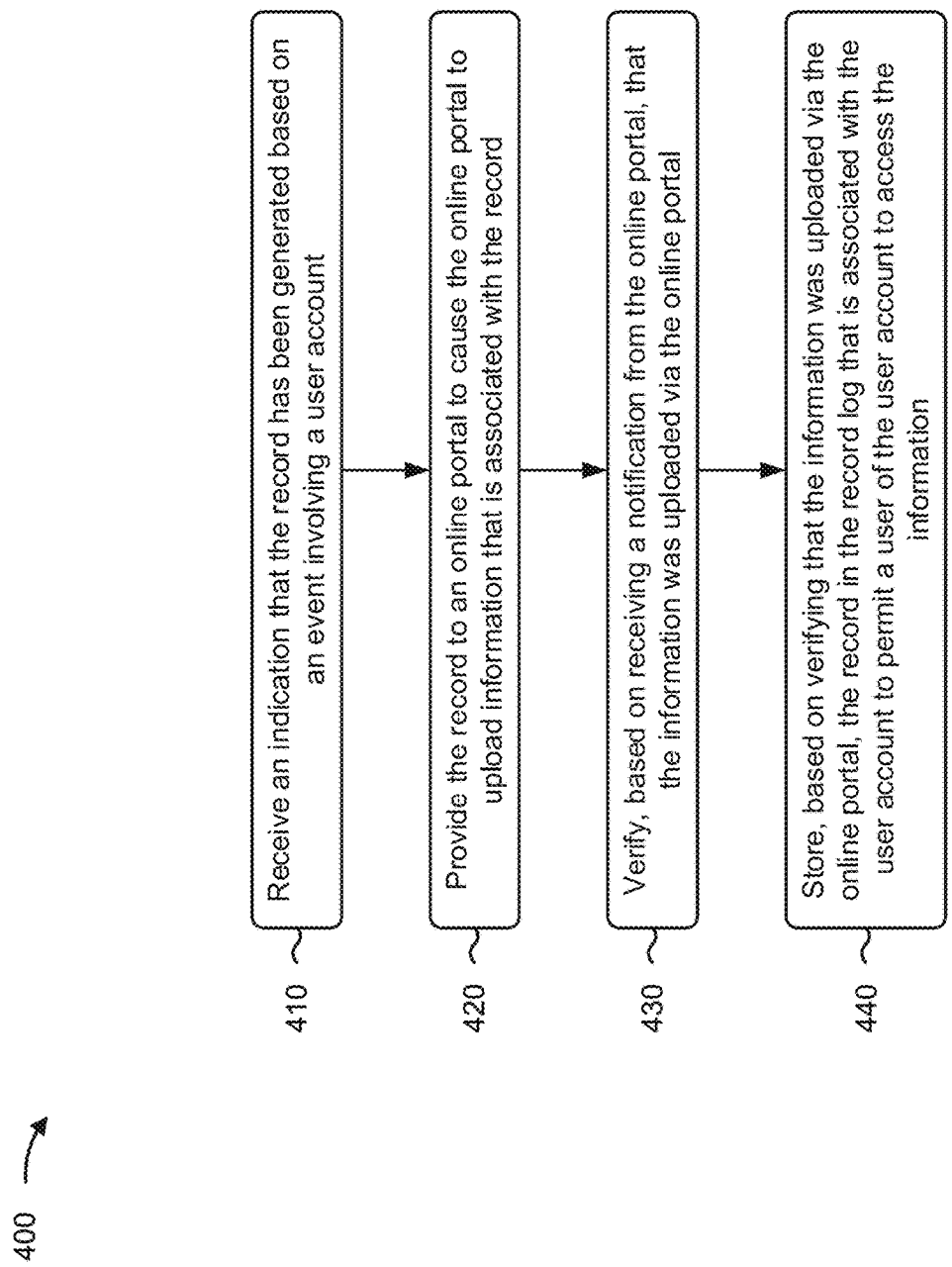
FIG. 4 is a flowchart of an example process relating to a record management system for enabling access to a record.

FIG. 4 is a flowchart of an example process 400 associated with a record management system for enabling access to a record. In some implementations, one or more process blocks of FIG. 4 may be performed by a record management system (e.g., the record management system 210). In some implementations, one or more process blocks of FIG. 4 may be performed by another device or a group of devices separate from or including the record management system, such as the transaction terminal 220, the management device 230, the online portal 240, the client system 250, and/or the user device 260. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an indication that the record has been generated based on an event involving a user account (block 410). As further shown in FIG. 4, process 400 may include providing the record to an online portal to cause the online portal to upload information that is associated with the record. The online portal may be accessible to one or more client systems that are configured to provide a service in association with the user account (block 420). As further shown in FIG. 4, process 400 may include verifying, based on receiving a notification from the online portal, that the information was uploaded via the online portal (block 430). As further shown in FIG. 4, process 400 may include storing, based on verifying that the information was uploaded via the online portal, the record in the record log that is associated with the user account to permit a user of the user account to access the information (block 440).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for verifying records to be stored in a record log, the system comprising:
one or more memories; and
one or more processors, communicatively coupled to the one or more memories, configured to:
receive an indication that a record has been generated based on an event involving a user account;
provide the record to an online portal to cause the online portal to upload information that is associated with the record,
wherein the online portal is accessible to one or more client systems that are configured to provide a service in association with the user account;
prevent information associated with a second record associated with the event from being stored in the record log until a particular status of the record is updated in a staging table to indicate that the information associated with the record was uploaded via the online portal, wherein the second record is associated with the record, and wherein the record is stored in the staging table and is associated with the particular status to prevent the second record from being stored in the record log;
verify, based on receiving a notification from the online portal, that the information associated with the record was uploaded via the online portal;
update the particular status of the record in the staging table that is used to process the record based on verifying that the information was uploaded via the online portal;
store, based on verifying that the information was uploaded via the online portal, the second record in the record log that is associated with the user account to permit a user of the user account to access the information; and remove the record from the staging table based on the second record being stored in the record log.

2. The system of claim 1, wherein the one or more processors are further configured to:
   determine an upload status that is associated with a third record that is associated with another event involving the user account,
      wherein the upload status indicates whether other information associated with the third record has been uploaded via the online portal; and
   verify, based on the upload status, that the other information has been uploaded via the online portal,
      wherein the second record is stored in the record log based on verifying that the other information has been uploaded via the online portal.

3. The system of claim 2, wherein the third record is identified based on determining that the event and the other event occurred within a same designated time period that is monitored in association with storing the second record and the third record in the record log.

4. The system of claim 1, wherein to store the second record, the one or more processors are configured to:
   store, in the record log and based on the particular status being updated, the information associated with the second record.

5. The system of claim 1, wherein the one or more processors are further configured to:
   prior to updating the particular status of the record in the staging table, identify that the record was added to the staging table.

6. The system of claim 4, wherein the second record and the record are stored in the staging table until any additional records that are associated with the user account and that are stored in the staging table have been verified as uploaded via the online portal.

7. The system of claim 4, wherein the second record and the record are prevented from being stored in the record log until any additional records that are associated with the user account and that are stored in the staging table have been verified as uploaded via the online portal.

8. The system of claim 1, wherein the one or more client systems are authorized to access the information based on an authentication process that verifies that the one or more client systems are associated with an entity that manages the user account.

9. A method, comprising:
   receiving, by a device, an indication that a record has been generated based on an event involving a user account;
   providing, by the device, the record to an online portal to cause the online portal to upload the record;
   preventing, by the device, information associated with a second record from being stored in a record log until a particular status of the record is updated in a staging table to indicate that the record was uploaded via the online portal, wherein the second record is associated with the record, and wherein the record is stored in the staging table and is associated with the particular status to prevent the second record from being stored in the record log;
   receiving, by the device and from the online portal, a notification that indicates that the record has been uploaded via the online portal;
   updating, by the device, the particular status of the record in the staging table that is used to process the record based on verifying that the record was uploaded via the online portal; and
   storing, by the device and based on receiving the notification, the second record in a record log that is associated with the user account; and
   causing the record to be removed from the staging table based on the second record being stored in the record log.

10. The method of claim 9, further comprising:
   prior to storing the second record in the record log, identifying, in the staging table that includes the record, a third record that is associated with another event involving the user account; and
   verifying that the third record has been uploaded via the online portal,
      wherein the second record and the third record are stored to the record log based on verifying that the record has been uploaded via the online portal.

11. The method of claim 10, wherein the third record is identified in the staging table for processing uploads of records via the online portal,
   wherein the staging table includes the third record and the record, based on the event and the other event occurring within a same time period.

12. The method of claim 9, wherein the online portal is accessible to one or more client systems that are configured to provide a service in association with the user account.

13. The method of claim 9, wherein the online portal is accessible to one or more client systems that are authorized to access the record,
   wherein the one or more client systems are authorized to access the record based on the one or more client systems being related to an entity that manages the user account.

14. The method of claim 9, wherein the record is generated based on at least one of:
   a transaction terminal providing information associated with the record; or
   a management device generating the record to include information.

15. A non-transitory computer-readable medium storing a set of instructions, the set of instructions comprising:
   one or more instructions that, when executed by one or more processors of a device, cause the device to:
      prevent information associated with a particular record from being stored in a record log until a particular status of another record is updated in a staging table to indicate that information associated with the other record was uploaded via an online portal, wherein the particular record is associated with the other record that is stored in the staging table and is associated with the particular status to prevent the particular record from being stored in the record log while the other record is associated with the particular status, and wherein the record is associated with a user account;
      receive a notification that indicates that the other record has been uploaded via the online portal,
         wherein the online portal is accessible to one or more client systems that are configured to provide a service in association with the user account;
      identify, in the staging table associated with uploading records via the online portal, the other record associated with the user account;
      verify that the information associated with the other record has been uploaded via the online portal;
      update the particular status in the staging table used to process the record based on verifying the information was uploaded; and store, based on receiving the notification and verifying that the other record has been uploaded, the particular record in a record log that is associated with the user account.

16. The non-transitory computer-readable medium of claim 15, wherein the one or more instructions further cause the device to:

prior to receiving the notification, provide the other record to the online portal based on the other record being added to the staging table,
wherein the notification is received from the online portal.

17. The non-transitory computer-readable medium of claim 15, wherein the other record is verified to have been uploaded based on an upload status of the other record in the staging table indicating that the other record has been uploaded.

18. The non-transitory computer-readable medium of claim 15, wherein the one or more instructions further cause the device to:

store, based on receiving the notification and verifying that the other record has been uploaded, the particular record in the record log.

19. The non-transitory computer-readable medium of claim 18, wherein the one or more instructions further cause the device to:

remove the particular record and the other record from the staging table after the particular record and the other record are stored in the record log.

20. The non-transitory computer-readable medium of claim 18, wherein the particular record and the other record are stored in the record log based on identifying that both the particular record and the other record have been uploaded to the online portal and determining that only the particular record and the other record are records in the staging table that are associated with the user account.

* * * * *